United States Patent
Yao et al.

(10) Patent No.: US 12,113,417 B2
(45) Date of Patent: Oct. 8, 2024

(54) WIRING FRAME, MOTOR STATOR, AND MOTOR APPLYING THEM

(71) Applicant: Li-Ho Yao, Taipei (TW)

(72) Inventors: Li-Ho Yao, Taipei (TW); Pi-Jen Hsieh, Taipei (TW); Pei-Sheng Hsieh, Taipei (TW); Chi-Chen Tien, Taipei (TW)

(73) Assignee: Li-Ho Yao, Taipei (TW)

( * ) Notice: Subject to any disclaimer, the term of this patent is extended or adjusted under 35 U.S.C. 154(b) by 308 days.

(21) Appl. No.: 17/581,992

(22) Filed: Jan. 24, 2022

(65) Prior Publication Data

US 2022/0255391 A1 Aug. 11, 2022

(30) Foreign Application Priority Data

Feb. 5, 2021 (TW) .................................. 110104505

(51) Int. Cl.
*H02K 3/52* (2006.01)
*H02K 1/14* (2006.01)
*H02K 3/28* (2006.01)

(52) U.S. Cl.
CPC ............. *H02K 3/522* (2013.01); *H02K 1/145* (2013.01); *H02K 3/28* (2013.01); *H02K 2203/06* (2013.01)

(58) Field of Classification Search
CPC .......... H02K 3/50; H02K 3/522; H02K 1/145; H02K 3/28; H02K 2203/12

(Continued)

(56) References Cited

U.S. PATENT DOCUMENTS 6,066,905 A * 5/2000 Wright .................... H02K 3/20
310/260
8,138,644 B2 * 3/2012 Kataoka ................ H02K 11/21
310/260

(Continued)

FOREIGN PATENT DOCUMENTS

CN 105119411 B * 9/2017
JP 6496229 B2 * 4/2019

OTHER PUBLICATIONS

Liu, "An Alternating Current Motor Stator Winding Connection Ring Connecting Structure", 2015, English Machine Translated. (Year: 2015).*

(Continued)

*Primary Examiner* — Christopher M Koehler
*Assistant Examiner* — Theodore L Perkins
(74) *Attorney, Agent, or Firm* — Leong C. Lei (57) ABSTRACT

A wiring frame, a motor stator, and a motor applying them are disclosed. The wiring frame is formed of an annular tray structure. A top surface of the wiring frame is formed, from inside to outside, with at least three guide channels that correspond, in number, to phases and are separated from each other. Further, the wiring frame includes a plurality of through holes, which communicate inside and outside, respectively formed in bottoms of the guide channels. As such, at least three conductive wires are allowed to extend through the through holes in the bottom of the wiring frame directly into the corresponding ones of the guide channels for winding, so as to ensure that the conductive wires of different phases are separated from each other to eliminate erroneous contact therebetween and thus enhance operation safety. The outside diameter and height of the wiring frame are reduced.

9 Claims, 6 Drawing Sheets

(58) Field of Classification Search
USPC .......................................................... 310/71
See application file for complete search history.

(56) References Cited

U.S. PATENT DOCUMENTS

| | | | |
|---|---|---|---|
| 9,685,844 B2* | 6/2017 | Nakamura | H02K 3/522 |
| 10,892,659 B2* | 1/2021 | Sakamoto | H02K 3/522 |
| 2013/0140926 A1* | 6/2013 | Bailey | H02K 7/14 |
| | | | 310/156.01 |

OTHER PUBLICATIONS

Matsunobu, "Rotating Electric Machine", 2019, English Machine Translated (Year: 2019).*

* cited by examiner

WIRING FRAME, MOTOR STATOR, AND MOTOR APPLYING THEM

TECHNICAL FIELD OF THE INVENTION

The present invention relates generally to a wiring frame, and more particularly to a wiring frame that is applicable to a motor stator of a motor that allows arrangement of windings to be implemented in an easy way and also helps reduce the overall size of the motor.

DESCRIPTION OF THE PRIOR ART

In the contemporary industry, vital issues concerning electric motors are operation safety and size reduction of the motors. For a three-phase motor, to prevent incorrect connection among wires of coil groups associated with different phases and undesired contact between such wires, a wiring frame is commonly arranged on a top of a stator of the motor for guiding wires of the coil groups of different phases to arrange closely in order to realize wire arrangement and to ease connection with a three-phase power source.

However, the known structure of the wiring frame of the motor stator is often opened in a lateral side to allow the wires of such coil groups to enter, through the lateral side, different wire channels in the wiring frame. Examples include Taiwan Patent No. 1681608 and 1708459. Such known wiring frames, however, demonstrate certain shortcoming in the uses thereof. For example, firstly, since the wires are extended through the lateral side of the wiring frame, the wire of the coil group that is located the lower side would have to bend to extend to the outer periphery first and then penetrate individually into the corresponding wire channel of the wiring frame. This insidiously makes wire arrangement inconvenient and sophisticated. Further, the wire is wound around the wiring frame and thus increases the outside diameter and expands the volumetric ratio thereof, so as to result in an increase of the volume of the motor.

Secondly, since the conductive wires of the three phases have to be wound on different wire channels of the wiring frame, the wire that is allocated in the inner-side wire channel, when extended through the lateral side, has to cross over the outer-side wire channel and the intermediate wire channel. To avoid erroneous contact, a structural arrangement has to be made on the wiring frame. For example, the patent document 1681608 provides a solution in which the wiring frame is structured to have bottoms of the wire channels located at different heights in order to stagger the wires of different phases. The patent document 1708459 provides a wiring frame in which partition plates located at different heights are provided in adjacent ones of the wire channels, in order to stagger the wires of different phases. Both ways will increase the overall height of the wiring frame, and this similarly expands the volumetric ratio and results in an increase of the volume of the motor.

Thirdly, further, following the previous description, the inner-side wire has to extend across the outer-side and intermediate wire channels of the wiring frame and the intermediate wire has to extend across the outer-side wire channel of the wiring frame. In such a condition, except the difference in respect of height, the wires of the coil groups are provided with no separators therebetween and there is a potential risk that the wires of the coil groups of different phases may get shorted with each other from time to time, resulting in safety concerns of the motor operation.

In other words, the know structure of a wiring frame structure for use in a stator of a motor is not ideal at all and may cause difficulty of wiring connection and results in a complicated process of assembly to thereby largely increase rate of errors and enlarge the overall size thereof so as to affect the size and weight of the motor and even lead to safety concerns of use.

SUMMARY OF THE INVENTION

The primary objective of the present invention is to enable wires of coil groups of a motor stator to effectively and separately extend into a wiring frame in order to simplify the wiring arrangement and to avoid erroneous contact among wires of different phases to thereby greatly improve operation safety thereof.

Further, a second objective of the present invention is to reduce an outside diameter and a height of a wiring frame, in order to reduce an overall volumetric ratio thereof to thereby reduce the volume of a motor.

A further objective of the present invention is to enable effective and efficient organization of wires of the coil groups for each individual phase, so that there is no need to enclose each of such wires with an insulation material, and thus fabrication and assembly can be effectively simplified to thereby further improve the product yield.

Further, an additional objective of the present invention is to enable the wires of the coil groups of individual phases to be wound in precise directions, in order to further reduce the complication of assembly and connection of wiring and also to effectively reduce the rate of errors.

DETAILED DESCRIPTION OF THE PREFERRED EMBODIMENT

Figure 1:
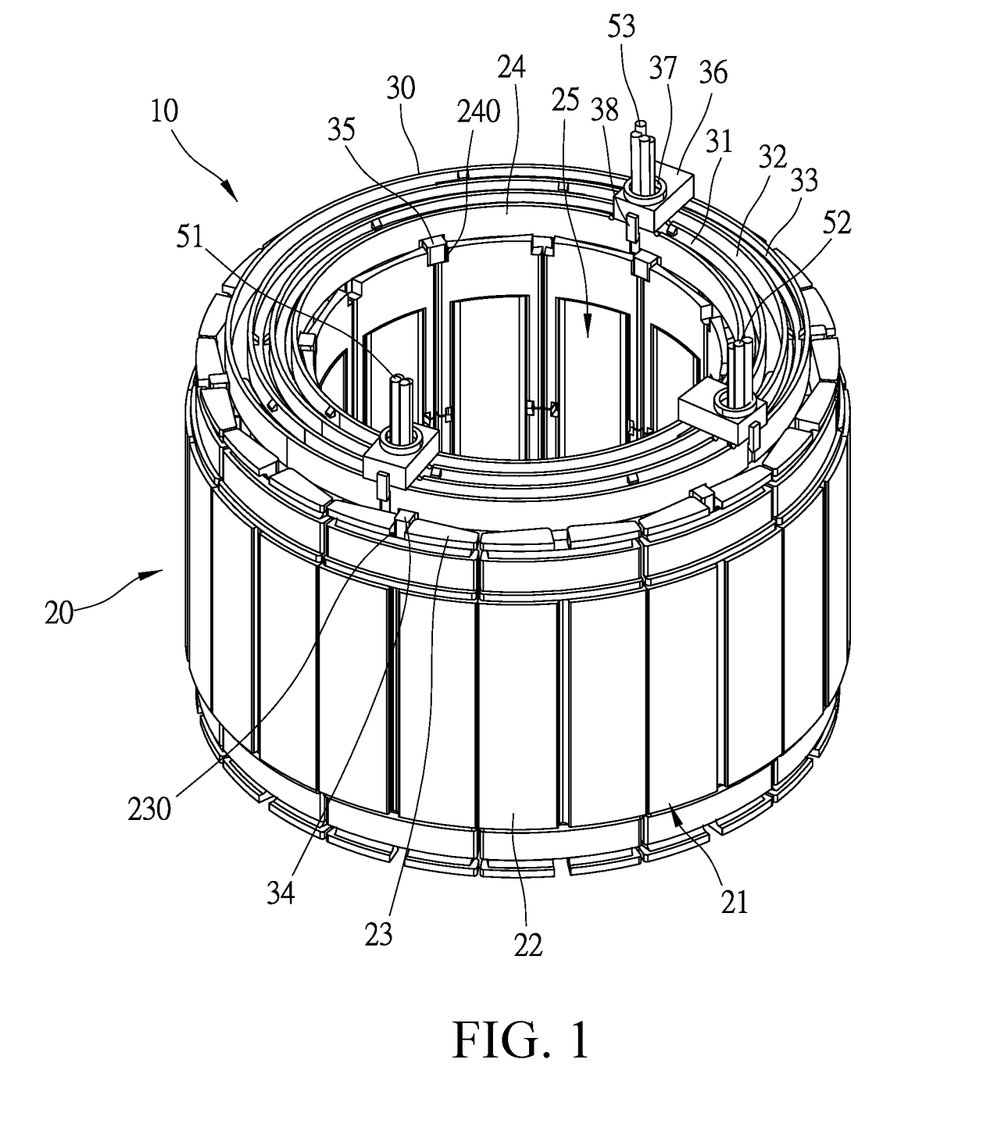
FIG. 1 is a perspective view showing a motor stator that applies a wiring frame according to the present invention.
Figure 2:
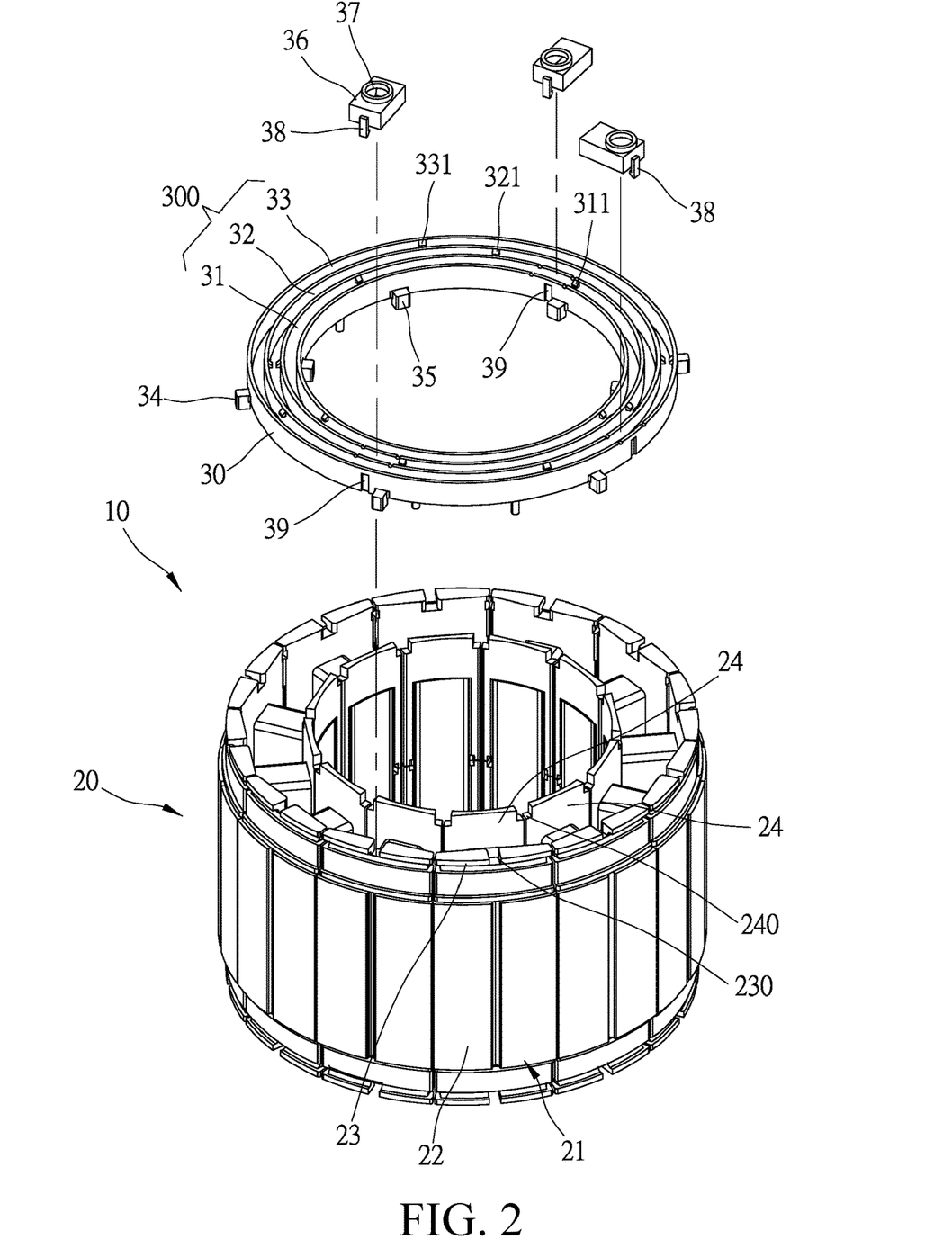
FIG. 2 is an exploded view showing the wiring frame according to the present invention.

The present invention relates to a wiring frame 30, and more particularly to a wiring frame 30 that is applicable to a motor stator of a motor. As shown in FIGS. 1 and 2, the motor stator 10 comprises an iron core 20 and a plurality of coil groups 25, wherein the iron core 20 comprises a plurality of silicon steel plates 21 and a plurality of I-shaped members 22. The silicon steel plates 21 are stacked and inter-connected to form a hollow cylindrical body having a predetermined thickness. The I-shaped members 22 are disposed on an inner circumferential surface of the hollow cylindrical body. Each of the I-shaped members 22 comprises an outside plate 23 and an inside plate 24, such that each of the I-shaped members 22 receives a conductive wire 51, 52, 53 to wind around between the inside and outside plates 24, 23 to form a coil group 25 corresponding to each different phase. A wiring frame 30 is mounted on a top of the iron core 20 to correspond to each of the coil groups 25 for guiding the conductive wires 51, 52, 53 of the coil groups 25 of the different phases together to realize a wiring arrangement operation for easy connection to a power source.

Figure 3:
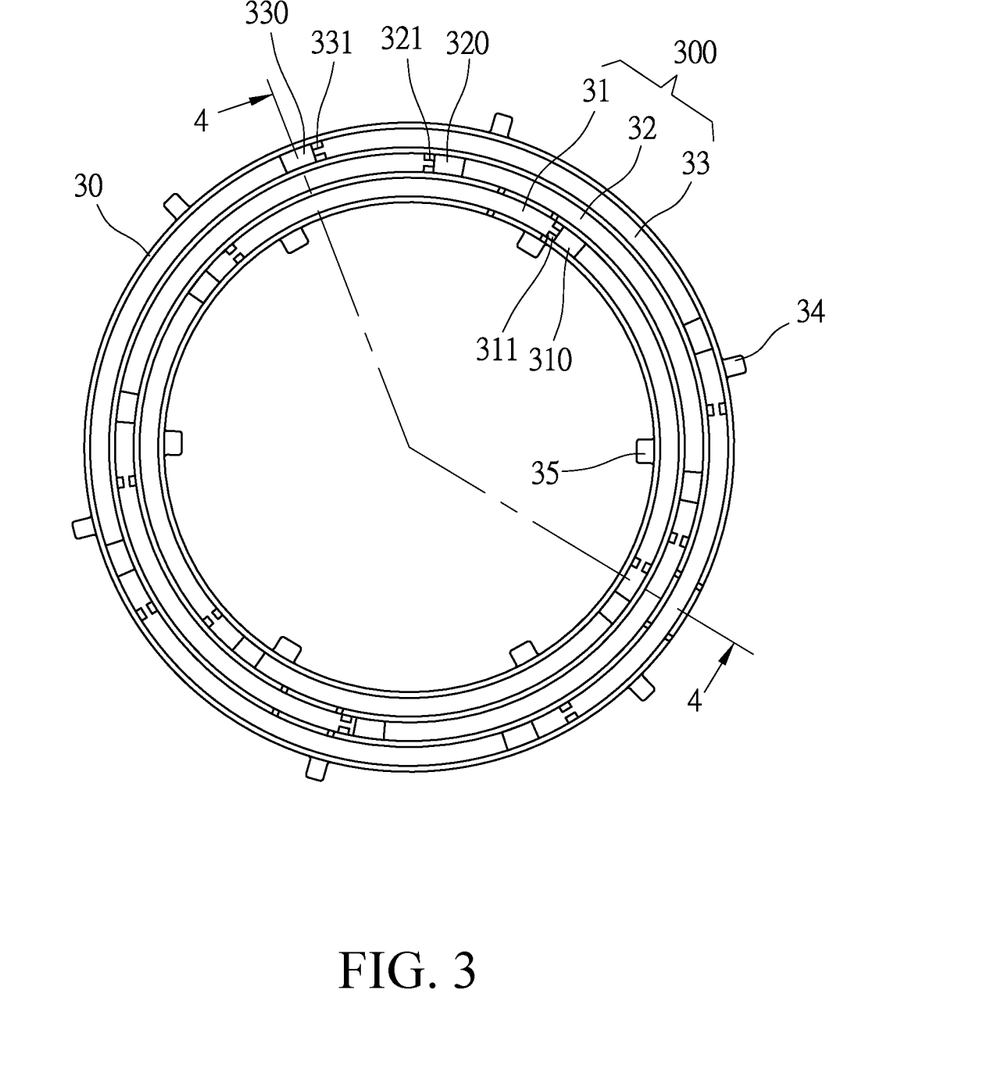
FIG. 3 is a top plan view showing the wiring frame according to the present invention.
Figure 4:
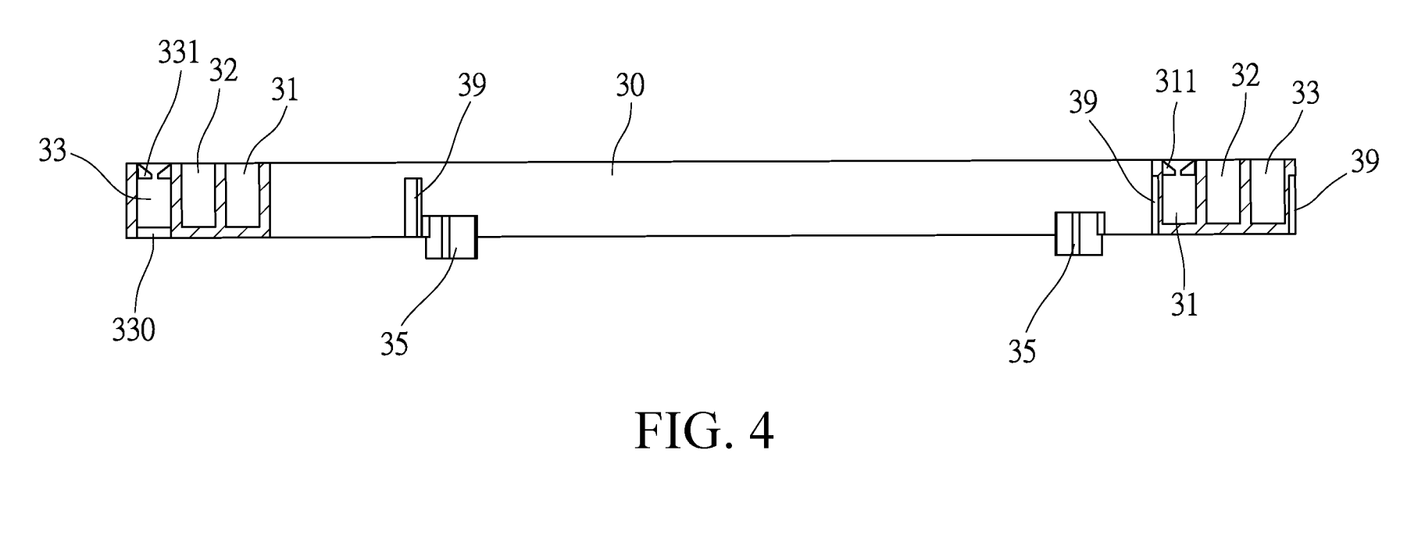
FIG. 4 is a cross-sectional view of the wiring frame according to the present invention, taken along line 4-4 of FIG. 3.

The present invention is characterized by the wiring frame 30, and a preferred embodiment of the wiring frame 30 is structured as shown in FIGS. 2, 3, and 4. The wiring frame 30 includes an annular tray structure, and the wiring frame 30 is formed, in a top surface thereof and arranged from inside toward outside, with at least three guide channels 300 that respectively correspond, in number, to the number of phases and are mutually separated from each other. For example, three guide channels 300 are provided for three phases; four guide channels 300 are provided for four phases; or five guide channels 300 are provided for five phases. According to some embodiments, the guide channels 300 have bottoms that are set at the same height. A three-phase motor is taken as a primary example for embodying the present invention, wherein three guide channels 300 that are separated from each other are formed in the top surface of the wiring frame 30 and are respectively defined, from inside to outside, a first guide channel 31, a second guide channel 32, and a third guide channel 33 to respectively receive the conductive wires 51, 52, 53 of the coil groups 25 to individually wind thereon. The wiring frame 30 is provided with a plurality of through holes 310, 320, 330 that communicate between inside and outside and are respectively formed in the bottoms of the first, second, and third guide channels 31, 32, 33 to receive the conductive wire 51, 52, 53 of each of the coil groups 25 to extend into a corresponding one of the first guide channel 31, the second guide channel 32, and the third guide channel 33 of the wiring frame 30 for winding, so as to ensure that the conductive wires 51, 52, 53 of the coil groups 25 that are associated with different phases are properly separated from each other, without any undesired erroneous contact therebetween, to thereby improve operation safety.

Figure 5:
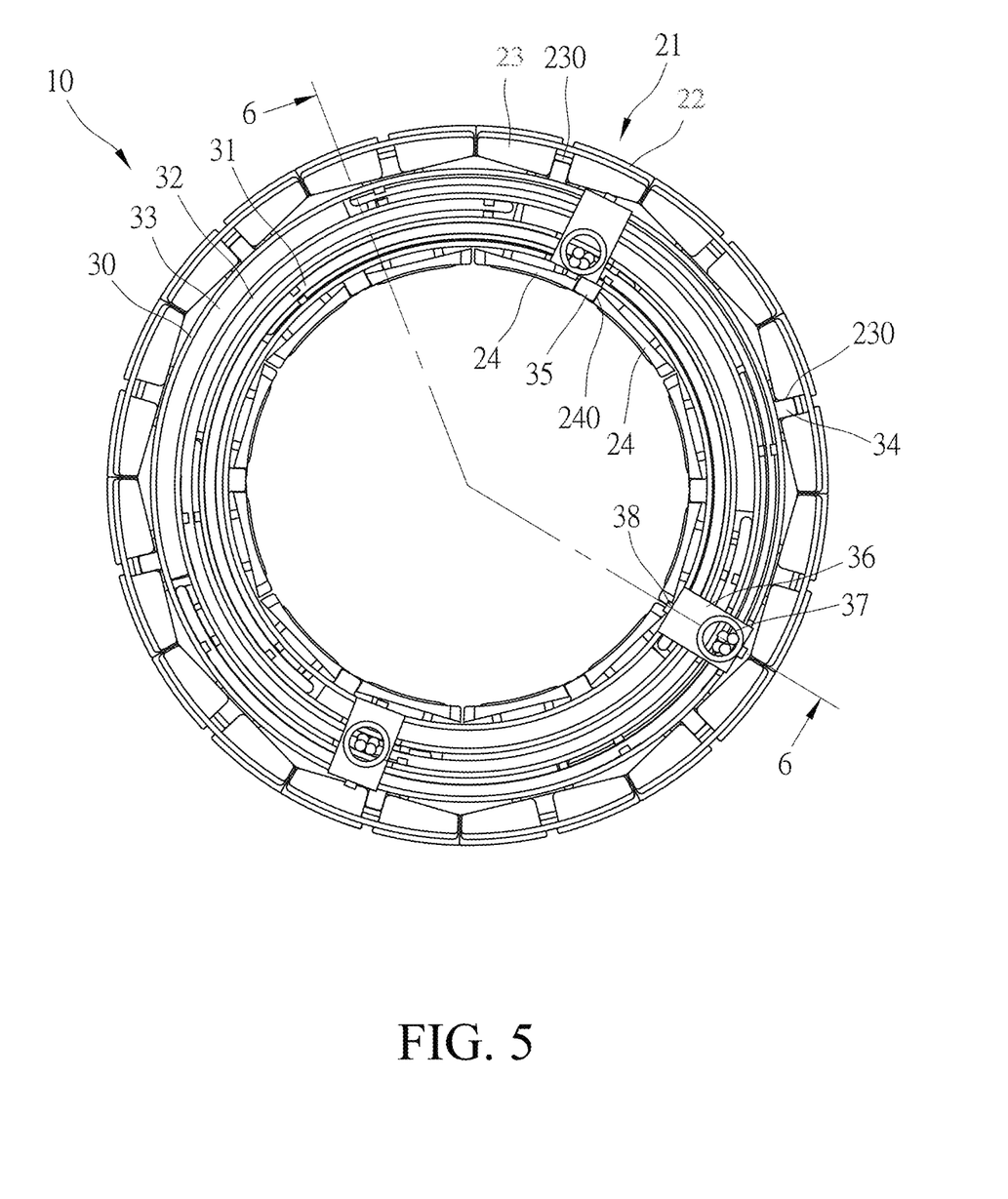
FIG. 5 is a top plan view showing the motor stator that applies the wiring frame according to the present invention.
Figure 6:
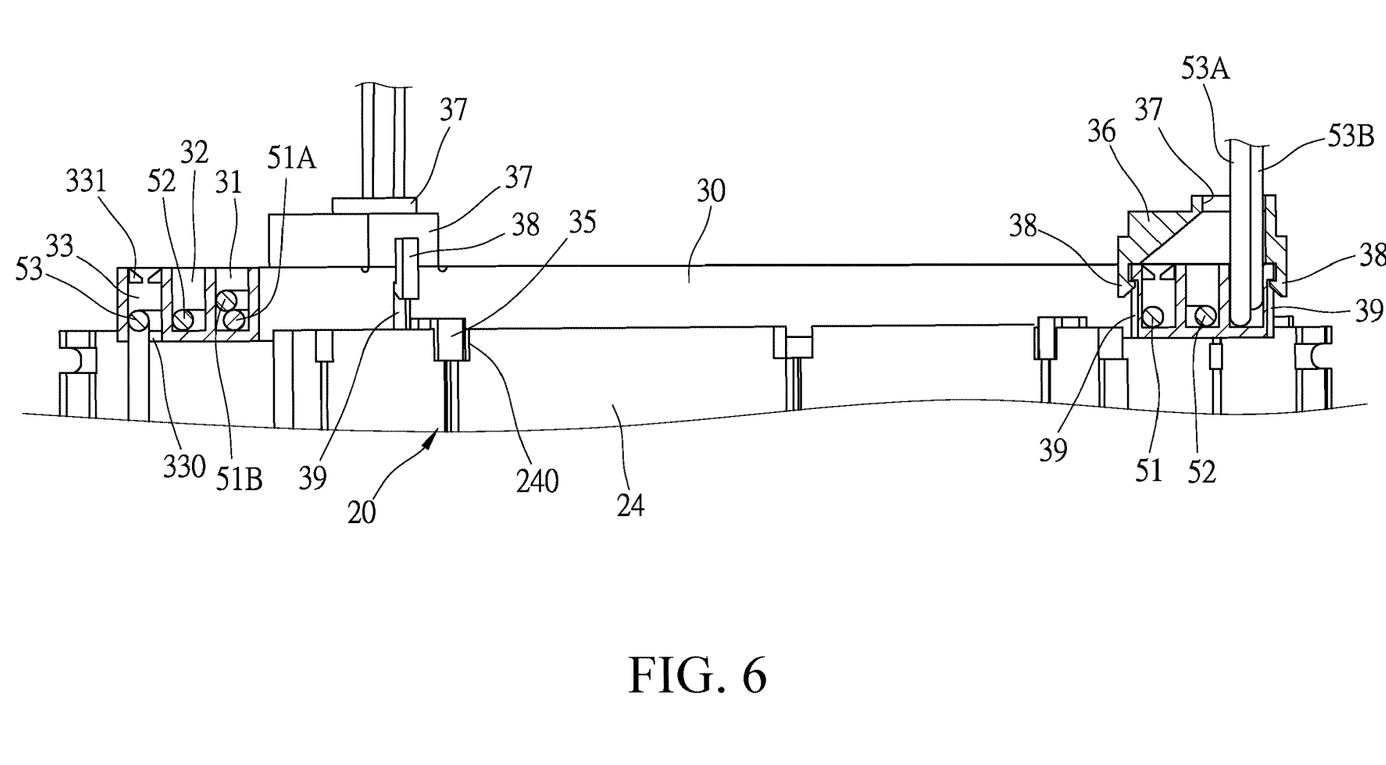
FIG. 6 is a cross-sectional view of the motor stator that applies the wiring frame according to the present invention, taken along line 6-6 of FIG. 5.

Further, the wiring frame 30 is provided with at least one wire holding block 311, 321, 331 in each of the first, second, and third guide channels 31, 32, 33 at one side of a correct winding direction of the conductive wire 51, 52, 53 to enable a user to identify the winding direction of the conductive wire 51, 52, 53 (as shown in FIG. 5), and to effectively prevent detachment and separation of the conductive wire 51, 52, 53 (as shown in FIG. 6). Further, the wiring frame 30 is provided, on an outer circumference thereof, with a plurality of external positioning blocks 34, which are respectively corresponding to and fit to the outside plates 23 of the I-shaped members 22 of the iron core 20, and tops of the outside plates 23 of the I-shaped members 22 are formed with fitting notches 230 corresponding thereto; further, the wiring frame 30 is provided, on an inner circumference thereof, with a plurality of internal positioning blocks 35, which are respectively corresponding to and fit to the inside plates 24 of the I-shaped members 22 of the iron core 20, and fitting notches 240 corresponding thereto are formed between tops of the inside plates 24 of adjacent ones of the I-shaped members 22, so that the wiring frame 30 may be fit to and securely fixed on the top of the iron core 20 by means of the external positioning blocks 34 on the outer circumference and the internal positioning blocks 35 on the inner circumference (as shown in FIGS. 1, 5, and 6).

Further, the wiring frame 30 is provided with a clamp block 36, which is arranged at a location corresponding to each one of the first, second, and third guide channels 31, 32, 33. The clamp blocks 36 are each formed with a wire hole 37 that communicates inside and outside at a location corresponding to a respective one of the first, second, and third guide channels 31, 32, 33, in order to receive the conductive wires 51, 52, 53 of corresponding phases to collectively extend outside. Each of the clamp blocks 36 are provided, on two ends thereof, with a clip tab 38, so as to be correspondingly fit to and in retaining engagement with the top surface of the wiring frame 30. The wiring frame 30 is formed, in the inner and outer circumferences thereof, with clip notches 39 that respectively correspond to the clip tabs 38 of the clamp blocks 36 to enable fitting and retaining engagement of the clamp block 36 to the top of the wiring frame 30 (as shown in FIGS. 1, 5, and 6), for easy organization of individual ones of the conductive wire 51, 52, 53 associated with the same phase, and to additionally realize an advantage of requiring no insulative enclosing material for the conductive wire 51, 52, 53 to thereby achieve easiness of assembly.

As such, the conductive wires 51, 52, 53 for different phases can respectively penetrate into the corresponding ones of the first, second, and third guide channels 31, 32, 33 through the through holes 310, 320, 330 in the bottom of the wiring frame 30, and a structure of wiring frame that is small is size and high in operation safety is achieved.

An actual application of the wiring frame 30 according to the present invention is illustrated in FIGS. 1, 2, 5, and 6, wherein the motor stator 10 is structured such that each of the I-shaped members 22 of the iron core 20 is individually and respectively wound around with a corresponding one of the conductive wires 51, 52, 53 to form each of the coil groups 25, and the conductive wire 51, 52, 53 of each of the coil groups 25 is individually and respectively extended, in an upward direction, through the through holes 310, 320, 330 in the bottoms of the first, second, and third guide channels 31, 32, 33 of the wiring frame 30, and as a result of such, the conductive wires 51, 52, 53 of the various phases are allowed to individually penetrate into the corresponding one of the first, second, and third guide channels 31, 32, 33 of the wiring frame 30, and are wound according to the arrangement directions of the wire holding blocks 311, 321, 331 of the first, second, and third guide channels 31, 32, 33, and the wiring frame 30 is mounted to the top of the iron core 20 by means of the external positioning blocks 34 and the internal positioning blocks 35.

Afterwards, the clamp blocks 36 are fit to the wiring frame 30, at corresponding locations, by means of the clip tabs 38, and the conductive wires 51, 52, 53 of identical phases are individually and collectively extended through the wire holes 37 of the clamp blocks 36 to realize the wiring arrangement operation for easy connection to the power source.

Based on the arrangement and description discussed above, the wiring frame 30 according to the present invention is structured to include a plurality of guide channels 300 that are separated from each other, such as the first, second, and third guide channels 31, 32, 33 for three phases, and provides an arrangement in which the bottoms of the guide channels 300 are respectively formed with the through holes 310, 320, 330, so that the conductive wires 51, 52, 53 of the coil groups 25 of the various phases can be extended from the underside of the wiring frame 30 into the corresponding ones of the guide channels 300, to thereby ensure the conductive wires 51, 52, 53 of the coil groups 25 of different phases are separated from each other to prevent erroneous contact therebetween and to enhance operation safety, so that, compared to the prior art, the outside diameter and the height of the wiring frame 30 can be reduced to thereby reduce the wiring frame 30, and even the volume of the motor.

Further, the wiring frame 30 is provided, inside the first, second, and third guide channels 31, 32, 33, with the wire holding blocks 311, 321, 331 to effectively indicate a correct winding direction for the conductive wire 51, 52, 53 so as to realize a foolproof effect and also to further effectively prevent detachment and separation of the conductive wire 51, 52, 53, together with the clamp blocks 36 that are provided on the wiring frame 30 to respectively correspond to the first, second, and third guide channels 31, 32, 33 to allow the conductive wire 51, 52, 53 of each phase to extend out together for easy organization of the conductive wire 51, 52, 53 of each individual phase and also for elimination of insulation material for enclosing the conductive wire 51, 52, 53 to further enhance easiness of assembly.

We claim:

1. A wiring frame, comprising an annular tray structure, a top surface that is formed, from inside to outside, with guide channels that are separated from each other, and a plurality of through holes that communicate inside and outside respectively formed in bottoms of the guide channels,
    wherein each of the guide channels of the wiring frame is provided with at least one wire holding block at one side of two opposite sides of the through hole, and the one side of the through hole indicates a winding direction in which a wire is intended to be wound in the guide channel.

2. The wiring frame according to claim 1, wherein the wiring frame comprises three guide channels.

3. The wiring frame according to claim 1, wherein the bottoms of the guide channels of the wiring frame are set at a same height.

4. The wiring frame according to claim 1, wherein the wiring frame is provided with one clamp block corresponding to each one of the guide channels, and the clamp block is formed with a wire hole, which communicates inside and outside, at a location corresponding to said each one of the guide channels.

5. The wiring frame according to claim 4, wherein the clamp block has a clip tab, and the wiring frame is provided, on inner and outer circumferences, with a clip notch corresponding to the clip tab of the clamp block.

6. A motor stator, comprising an iron core, a plurality of coil groups that comprise conductive wires, and the wiring frame according to claim 1 mounted on tops of the iron core and the coil groups.

7. The motor stator according to claim 6, wherein the iron core comprises a plurality of silicon steel plates and a plurality of I-shaped members, the silicon steel plates being stacked and interconnected to form a hollow cylindrical body having a predetermined thickness, the I-shaped members being disposed on an inner circumference of the hollow cylindrical body, each of the I-shaped members comprising an outside plate and an inside plate and receiving, according to various phases, one of the conductive wires to wind around between the inside and outside plates of the I-shaped member to form one of the coil groups.

8. The motor stator according to claim 7, wherein the wiring frame has an outer circumference on which a plurality of external positioning blocks are formed, and the wiring frame has an inner circumference on which a plurality of internal positioning blocks are formed, and tops of the outside plates of the I-shaped members of the iron core are formed with fitting notches respectively corresponding to the external positioning blocks, and fitting notches that respectively correspond to the internal positioning blocks are formed between adjacent ones of tops of the inside plates of the I-shaped members.

9. A motor, the motor comprising a casing, the motor stator according to claim 6, and a motor rotor.

\* \* \* \* \*